United States Patent [19]

Nakano

[11] 4,441,800

[45] Apr. 10, 1984

[54] DRIVING SYSTEM IN CAMERA

[75] Inventor: Yoshiyuki Nakano, Tokyo, Japan

[73] Assignee: Nippon Kogaku K.K., Tokyo, Japan

[21] Appl. No.: 379,347

[22] Filed: May 18, 1982

[30] Foreign Application Priority Data

May 25, 1981 [JP] Japan .................................. 56-77938
May 25, 1981 [JP] Japan .................................. 56-77939

[51] Int. Cl.³ ............................................ G03B 19/12
[52] U.S. Cl. ................... 354/152; 354/173.1; 354/271.1
[58] Field of Search ............... 354/152, 153, 173, 271

[56] References Cited

U.S. PATENT DOCUMENTS 3,690,241 9/1972 Nomura ........................... 354/152 X
4,182,557 1/1980 Date et al. ...................... 354/152 X Primary Examiner—John Gonzales
Attorney, Agent, or Firm—Shapiro and Shapiro

[57] ABSTRACT

A portion of the driving force for the aperture control apparatus is used to accumulate mechanical energy as required to drive a certain particularly selected device which is to be operated after the operation of the aperture control apparatus. To this end, there is provided mechanical energy accumulation means connected to the driving source. As the result of the work of the mechanical energy accumulation, the speed of the displacement mechanism is reduced.

10 Claims, 25 Drawing Figures

DRIVING SYSTEM IN CAMERA

BACKGROUND OF THE INVENTION

1. Field of the Invention

The present invention relates to a driving system for use in camera and especially to a diaphragm driving system and/or a mirror driving system. More particularly, the present invention relates to a mechanical apparatus for driving diaphragm and/or mirror in a camera.

2. Description of Prior Art

In the art there are known various types of automatic aperture control apparatus for camera. In one of the typical automatic aperture control apparatus, when the diaphragm aperture continuously changing toward the minimum aperture from the maximum reaches the position corresponding to the aperture value determined by the result of a photometric operation, it is detected. In synchronism with the detection, the mechanism moving to drive the diaphragm blade is latched by electromagnetic means or the like. Since the diaphragm blade driving mechanism is so designed as to be shifted from one position to another to drive the diaphragm blade, it is essential to suitably reduce the moving speed of the shifting mechanism in order to improve the accuracy of diaphragm control. The reason for this will be described in detail hereinafter.

In the above mentioned type of control apparatus, the electromagnetic latching device has inevitably a time lag in operation. Therefore, at least a short time before the electromagnetic device is actuated, the moving speed of the shifting mechanism should be reduced to a level sufficient and enough to set the desired diaphragm aperture value. Otherwise, there may be produced a large error in setting the aperture value.

The time lag may be compensated by an early actuation of the electromagnetic latching device. More particularly, some time before the diaphragm aperture reaches the predetermined aperture value an instruction signal is applied to the electromagnetic device to start the latching operation. However, this solution involves many problems.

In the case of lens interchangeable camera of the type in which many different interchangeable lenses are adoptable and the diaphragm driving lever on the lens side is moved together with the above mentioned displacement mechanism in the camera, it is very difficult to correctly compensate the time lag employing the above solution. The reason for this is that the respective interchangeable lenses are different each other in inertia of the lens diaphragm.

Even for those cameras having one and single lens, the use of the above solution makes structure of the camera much more complicated and also increases up the manufacturing cost.

Another drawback of the above solution is that it is impossible to accurately determine the aperture value. This problem of inaccurate aperture value may be solved by reducing the driving force used for shifting the displacement mechanism. However, since the displacement mechanism has an inherent frictional loss, the stability of its operational speed may be greatly lost by such reduction of the driving force. To overcome the difficulty, therefore, such reduction system is required which can reduce the speed in a stable manner while using a sufficiently large driving force. Such reduction system can be realized only when there are provided particular inertia brake, mechanical clock mechanism and electromagnetic brake. Even if such reduction system can be obtained, it has to be returned back to the starting position every time of operation. This needs a large returning force. Furthermore, the use of such reduction means will make the structure of the apparatus very complicated. At the same time, the work required to operate such reduction mechanism will directly or indirectly cause a substantial increase of the power of the camera required to take up film.

SUMMARY OF THE INVENTION

Accordingly, it is the primary object of the present invention to provide an aperture control apparatus which enables to attain the desired speed reduction of the displacement mechanism in a stable manner with a simple construction and without any loss of work.

To attain the object according to the invention, a portion of the driving force for the aperture control apparatus is used to accumulate mechanical energy as required to drive a certain particularly selected device which is to be operated after the operation of the aperture control apparatus. To this end, there is provided mechanical energy accumulation means connected to the driving source. As a result of the work of the mechanical energy accumulation, the speed of the displacement mechanism is reduced.

In an embodiment of the invention, the operation for shutter charging is used to accumulate the mechanical energy required for driving the selected device.

In an aperture controlled single lens reflex camera provided with a reflex mirror, the work necessary for charging a mirror driving spring can be used to produce the load necessary for the aimed speed reduction. As well known to those skilled in the art, the reflex mirror is retracted from the photographing optical path immediately before exposure. As the driving source for the mirror there is usually used a spring. According to the invention, the work for charging this spring can be used as the load for the speed reduction.

According to another embodiment of the invention, the work necessary for charging the spring for shifting the light measuring photo-receptor element from the light receiving position to the non-light receiving position is used as the load necessary for the aimed speed reduction.

Means for accumulating energy is never limited only to potential energy accumulating means such as spring. For the purpose of the invention there may be used also kinetic energy accumulating means such as fly wheel.

Other and further objects, features and advantages of the invention will appear more fully from the following description of preferred embodiments taken in connection with the accompanying drawings.

DESCRIPTION OF PREFERRED EMBODIMENTS

Figure 1:
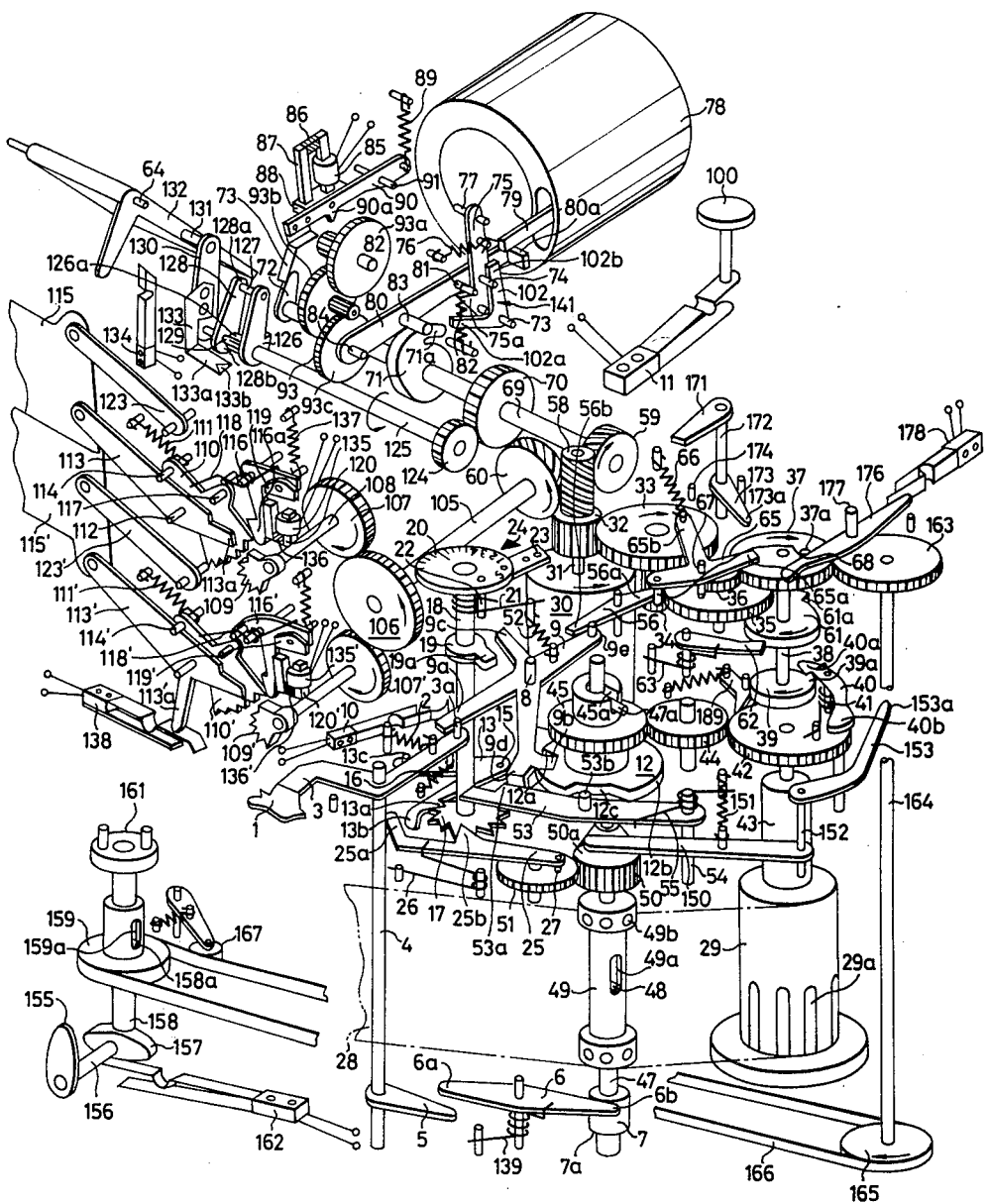
FIG. 1 is a perspective view showing an embodiment of the invention.

FIG. 1 shows the first embodiment of the present invention in which the work for shutter charge is used to reduce the shifting speed of the displacement mechanism by which the diaphragm blade is driven.

In the apparatus shown in FIG. 1, all of the driving forces required for the operations given under are obtained from one and single motor 30.

Take-up of a film 28 for which a take-up spool 29 and a take-up sprocket 49 are driven;

Rewinding of the film 28 for which a rewind driving member 161 is driven;

Stopping down and opening the aperture of a lens 78 for which a diaphragm interlocking lever 79 is driven;

Moving up and down a quick return mirror supporting frame 132;

Shutter charging for accumulating a biasing force for shutter opening blade 115 and shutter closing blade 115', etc.

Hereinafter, details of the respective parts of the apparatus will be described in connection with the picture taking procedure of the camera.

At first, the film 28 is loaded on the camera. To this end, the back lid of the camera is unlocked in the manner known per se. After unlocked, the back lid is allowed to open and a part 1 of the back lid is moved leftward as viewed in FIG. 1.

With the leftward movement of the back lid portion 1, a lever 3 rotates counter-clockwise about a shaft 4 under the biasing force of a spring 2. At the same time, a lever 5 fixed to the shaft 4 rotates also counter-clockwise to push one end 6a of a supporting lever 6. Thereby, the lever 6 is rotated clockwise so that the state of rewinding is released. A rewinding button 7 which has been in its raised position is returned back to its starting position. In this position, the rewinding button 7 and the lever 6 have a determined positional relation as shown in the figure. The state for rewinding and releasing from the state will be further described later.

Figure 6:
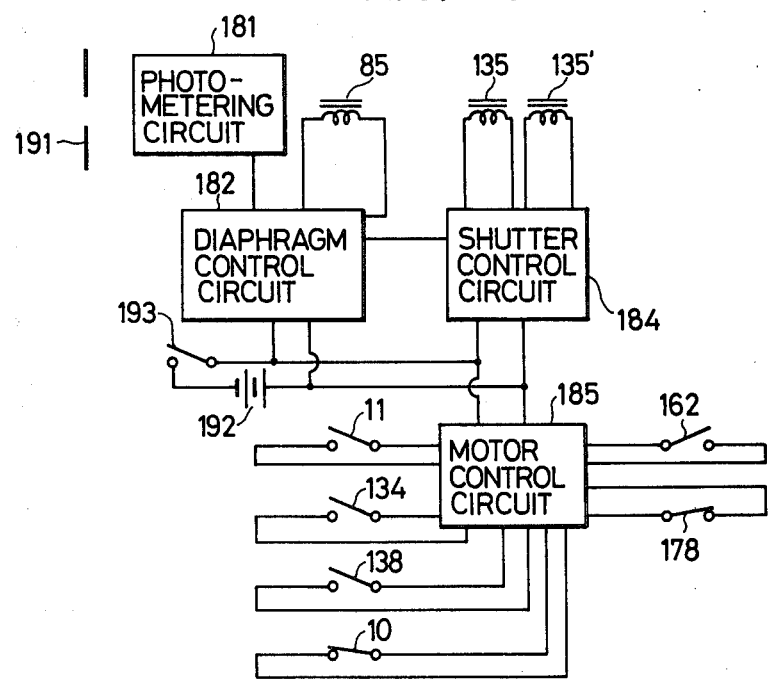
FIG. 6 is a block diagram of the electrical control circuit for the camera shown in FIG. 1.

The lever 3 has a pin 3a at another end thereof. With the counter-clockwise rotation of the lever 3, the pin 3a pushes one arm 9a of a film take-up limiting lever 9 thereby rotating the lever 9 clockwise about a shaft 8. Disposed behind the arm 9a is a film take-up limiting switch 10 which is turned ON by the clockwise rotation of the lever 9. The switch 10 is connected with a motor control circuit 185 (FIG. 6). The control circuit 185 is so formed as to reverse the rotational direction of the motor 30 when a push button switch 11 is pushed ON so long as the switch 10 is ON. At that time, the motor 30 rotates the the opposite direction to the arrow in FIG. 1. The lever 9 has a hook 9b provided at the tip end of another arm of the lever. With the clockwise rotation of the lever 9, the hook 9b moves leftward as viewed in FIG. 1 so that the hook is disengaged from a notch 12a formed on a disk 12. The disk 12 is so mounted as to transmit torque to a sprocket shaft 47. When the hook is disengaged from the notch, the disk 12 is allowed to rotate.

With the counter-clockwise rotation of the lever 3, a film frame counter locking pawl 13 also rotates clockwise. More particularly, a pin 13c at one end of the pawl is pushed leftward by the lever 3 rotating counter-clockwise so that the pawl 13 is rotated clockwise about the axis 15 against the biasing force of a spring 16. As a result of it, the engaging portion 13a of the pawl 13 is disengaged from a ratchet wheel 17 and retracted leftward away from the ratchet. The ratchet wheel 17 is fixedly mounted on a shaft 18 on which also a cam 19 and a frame number dial 20 are fixedly mounted for ration with the shaft. Therefore, when the pawl 13 is retracted from the ratchet wheel, all of the ratchet 17, cam 19 and dial 20 are rotated together counter-clockwise by the force of a spring 21. This counter-clockwise rotation of the shaft 18 with ratchet 17, cam 19 and dial 20 continues until a pin 22 depending from the dial 20 comes into contact with a stopper plate 23 provided on a base plate not shown. When stopped, the symbol s on the dial 20 is just in opposition to a pointing mark 24 indicating the reset position of the frame counter.

Although there is provided another pawl 25 engageable with the ratchet 17, this pawl does not interfere with the above counter-clockwise rotation of the ratchet. With the clockwise rotation of the first pawl 13, the tip end 25a of the second pawl is pushed by the tip end 13b of the first pawl and the pawl 25 is rotated counter-clockwise about the axis 27 against the force of a spring 26. Therefore, the engaging portion 25b of the second pawl is retracted from the position engageable with the ratchet wheel 17.

All of the above operations are performed when the lid of the camera is opened. After opening the back lid, the operator loads the film into the camera, during which the motor 30 remains stopping.

After loading the film, the leader portion of the film is fed by a film feed system until the first frame of the film is set in the position prepared for picture taking. The manner of operation for feeding the film leader is as follows:

The operator inserts the leading end of the film into a slot 29a of the spool 29 and pushes a button 100 to turn the switch 11 ON. Since, as already described, the switch 10 is ON at this time, the motor control circuit 185 detects turn-ON of the push button switch and makes the motor 30 start turning in the direction opposite to the arrow. With this rotation of the motor 30, a pinion 32 and a worm fixed on the motor shaft 31 rotate clockwise, and gears 33, 59 and 60 turn in the direction opposite to the arrow. The rotation of the pinion 32 is transmitted to gear 33, pinion 34, gear 35, pinion 36 and gear 37. Thus, the gear 37 is rotated in the direction opposite to the arrow. The reduction gear train extending from the pinion 32 to the gear 37 is provided to obtain from the miniature motor 30 a torque as required for film feed.

At the lower portion of the shaft 38 on which the gear 37 is fixed there is fixedly mounted also a film feed plate 39 which rotates in the same direction as the gear 37 does, namely in the direction opposite to the arrow. At this counter-clockwise rotation of the film feed plate 39, its projection 39a comes into engagement with the hook portion 40a of a film feed pawl 40. Since the rotation axis 41 of the pawl 40 is a stud fixed on the gear 42, the latter is rotated in the same direction as the film feed plate 39. Consequently the spool 29 starts rotating counter-clockwise through a known spool friction mechanism 43 to take up the film 28 around the spool 29.

On the other hand, the rotation of the gear 42 is transmitted to gears 44 and 55. But, this does not lead directly to rotation of the sprocket shaft 47. The reason for this will be described with reference to FIG. 2.

Figure 2:
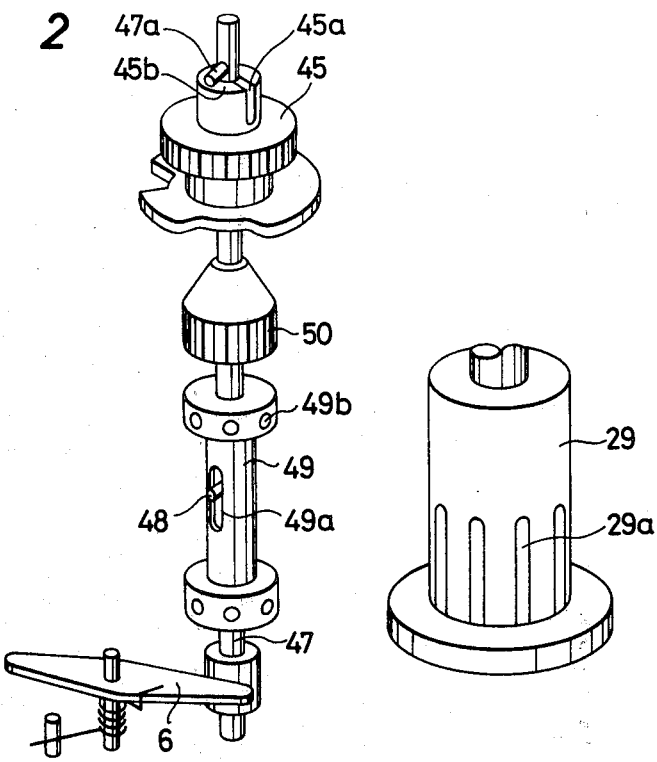
FIG. 2 is a perspective view illustrating the manner of operation of the sprocket shown in FIG. 1.

As previously noted, the apparatus is released from the state for rewinding by the clockwise rotation of the support lever 6. At the time point when the rewinding of the used film is completed, the pin 47a on the upper portion of the sprocket shaft 47 and the slot 45a provided on the upper part of the gear 45 are generally out of phase to each other. Therefore, the pin 47a can only contact with the upper surface 45b of the gear 45 as shown in FIG. 2 although a spring not shown intends to move the sprocket shaft 47 downwardly. For this reason, the sprocket 47 does not rotate with the rotation of the gear 45. Therefore, a sprocket pin 48 provided in the middle of the shaft 47 does not rotate either. Since the sprocket 49 is movable only up and down relative to the pin 48 through a slot 49a, the gear 45 has not part in rotation of the sprocket 49. In this phase of operation, therefore, the film 28 is moved only by winding up the film around the spool 29, and the sprocket 49 and the sprocket shaft 47 are driven into rotation only through the engagement between the not shown film perforations and the teeth 49b on the sprocket 49.

However, as well known to those skilled in the art, in the apparatus of the type in which the spool and the sprocket are driven by the same driving source, the spool and the sprocket are designed in such manner that the spool can take up a slightly larger amount of film than the sprocket does for a unit time. Therefore, at a time point during the above film feeding, the phase of the pin 47a gets in coincidence with the phase of the slot 45a and the pin engages in the slot. After this time point, the amount of feed of the film 28 is determined solely by the rotation of the gear 45. The shown embodiment has the same operation as this.

Referring again to FIG. 1, the operation of counting-up of the film frame counter will be described hereinafter.

A gear 50 is fixed on the upper portion of the sprocket shaft 47. The gear is always in mesh with a gear 51. At an eccentric position on the gear 51 there is provided the above mentioned shaft 27 for the feed pawl 25. During the rotation of the sprocket shaft 47, that is, during the rotation of the gear 51 through the gear 50, the feed pawl 25 executes a reciprocating motion nearly leftward and rightward. Until this time point, the back lid of the camera has already been closed and the lever 3 has been rotated clockwise by the part 1 of the lid. Therefore, the pawl 13 is rotated counter-clockwise by the force of the spring 16 and the engaging portion 13a of the pawl is engageable with the ratchet 17.

With the counter-clockwise rotation of the pawl 13, its tip end 13b moves rightward to allow the tip end 25a of the feed pawl 25 to move rightward up. Under the action of the spring 26, the pawl 25 rotates clockwise and its engaging portion 25b is brought to the position engageable with the ratchet 17. In the manner known per se and therefore not further described herein, the gear 51 is rotated by the rotation of the sprocket 49 in an amount corresponding to one frame of the film 28 and the feed pawl 25 is reciprocally moved. The ratchet 17 is rotated tooth by tooth clockwise by the engaging portion 25b of the pawl 25. As a result of this stepwise film feeding, the frame number dial 20 is rotated from "s" to the position in which "1" is against the indication mark 24.

During the above motion, the limiting disk 12 on the sprocket shaft 47 rotates a plural number of times. At this time, since the lever 9 is biased toward counter-clockwise rotation by a spring 52, the lever 9 rotates counter-clockwise about the shaft 8 and the hook 9b of the lever comes into contact with the circumference 12b of the disk 12. When the hook 9b comes to the position just against the notch 12a, the former gets in engagement with the latter. By this engagement between hook 9b and notch 12a the idle feeding of the film may be stopped. To prevent it and assure a safe idle feeding of the film up to the first picture frame, the cam 19 operable together with the dial 20 is particularly designed. The cam 19 has a projection 19a which can contact with one arm 9c of the lever to prevent the above mentioned counter-clockwise rotation of the lever 9. But, the projection 19a departs from the arm 9c to release it from the contact immediately before the number "1" on the dial 20 comes to the position just against the mark 24. Therefore, the lever 9 rotates counter-clockwise and its hook portion 9b engages in the notch 12a only after a determined amount of the film 28 has been fed completely. At this time point, the film feeding is mechanically stopped. During the step of film feed from "s" to "1" on the dial 20, the film take-up limiting member remains inactive. Therefore, the switch 10 which has been pushed by the arm 9a of the lever until that time is now turned OFF and the motor control circuit 185 cuts off the current applied to the motor 30. In this manner, the idle feeding of the film is completed.

The function of lever 53 will be described hereinafter.

The lever 53 is under the force of a spring 55 intending to rotate the lever clockwise about the axis 54. The lever 53 has a stud pin 53b on the upper surface. The pin is in contact with the circumference of the disk 12. The end 53a of the lever 53 is engageable with the end 9a of the lever 9 to lock it only when the stud pin 53b is in contact with the recessed area 12c of the circumference of the disk 12. The size of the end 53a of the lever 53 is so determined as to lock the end 9d of the lever 9 only when the lever 9 is rotated clockwise by a sufficient large angle.

The sufficient large angle rotation of the lever 9 occurs when the lever is rotated through the engagement between its arm 9a and the pin 3a on the lever 3 at the time of the back lid of the camera being opened and when the pin 9e on the lever 9 is pushed by the end of an intermediate lever 56 at the time of the lever 56 being rotated counter-clockwise as described later. When the hook 9b is in contact with the circumference 12b of the disk 12, the clockwise rotation angle of the lever 9 is small and therefore the end 53a of the lever 53 can not engage with the end 9d of the lever 9. The lever 9 is allowed to rotate counter-clockwise with its hook portion 9b being in contact with the circumference area 12b of the disk 12 without being stopped by the lever 53, and then it falls in the notch 12a of the disk 12.

During the step of the above idle film feeding, the diaphragm interlocking lever 79, shutter opening blade 115, shutter closing blade 115' and the quick return mirror supported by the holding frame 132 are not driven. The operation of these elements will be described later.

Now, the operation for picture taking and the following film take-up operation will be described.

Again, the push button 100 is pushed down whereby the push button switch 11 is turned ON. Since the switch 10 is OFF at the time, the motor control circuit 185 makes the motor 30 start rotating in the direction of arrow (forward rotation). Thereby the pinion 32 and the worm 58 fixed on the motor shaft 31 are rotated. Also, the gear 33 in mesh with the pinion 32 and the gears 59 and 60 in mesh with the worm 58 are rotated in the direction of arrow.

For the purpose of explanation, the system moved interlocking with the engaged pinion 32 and gear 33 is referred to as film feeding system. The operation of the film feeding system is as follows:

The rotation of the motor shaft 31 is converted into suitable revolution number and torque through the above described reduction gear train and rotates the gear 37 in the direction of arrow. With the clockwise rotation of this gear 37, the shaft 38 on which the gear 37 is fixedly mounted is rotated. Also, the rotation limiting disk 61 and the film feed plate 39 on the same shaft 38 start rotating in the direction of arrow. The disk 61 has an engaging part 61a formed on the circumference. A pawl 62 for locking the mirror against upward movement is in contact with the circumference of the disk 61 under the biasing force of a spring 63 intending to the pawl toward counter-clockwise rotation. The disk 61 has an engaging portion 61a formed on the circumference. When the disk is rotated by a certain determined rotation angle starting from the position shown in FIG. 1, the pawl 62 gets in engagement with the engaging portion 61a of the disk to prevent further rotation of the disk 61. This serves as a stopper for the later described diaphragm driving system, mirror driving system and shutter charge system. The film feed plate 39 fixed on the same shaft 38 has a projection 39a. At the start of picture taking operation, the projection is in engagement with the hook portion 40a of the film feed pawl 40. With the clockwise rotation of the plate 39, the projection 39a is released from the engagement with the pawl 40. Therefore, the clockwise rotation of the plate 39 is not transmitted to the pawl 40. Consequently, in case of this operation, the gear 42 and the elements on the downstream side of the gear 42 are all not driven into rotation and remain standing still, which is different from the operation for idle film feeding described above. As the gear 42 and all of the members downstream of the gear 42 do not rotate, no film feed is done during this step.

In the course of the above clockwise rotation, the stud pin 37a on the gear 37 pushes one arm 65a of a lever 65 for removing the limitation on film take-up. Thereby, the limitation removing lever 65 is rotated counter-clockwise about a pivot 67 against the biasing force of a spring 66. However, at the time, a stud pin 68 on another arm of the lever 65 moves in the direction away from one end 56a of the intermediate lever 56, and therefore the intermediate lever 56 is not affected by the rotation of the lever 65. As the lever 56 is not rotated by the lever 65 and the lever 9 is not rotated by the lever 56, the limitation on film take-up remains active although the limitation removing lever 65 is rotated counter-clockwise.

The system moved interlocking with the engaged worm 58 and gear 59 is hereinafter referred to as diaphragm driving system. The operation of this diaphragm driving system is as follows:

By the forward rotation of the motor 30 the gear 59 is rotated in the direction of arrow. With the rotation of the gear 59, the shaft 69 on which the gear 59 is fixedly mounted, a gear 70, a cam 71 and a magnet reset cam 72 are rotated in the same direction all together. However, since the clockwise rotation of the rotation limiting disk 61 in the film feeding system is limited by the locking pawl 62, the rotation of the motor shaft 31 is limited through the gear train. For this reason, the clockwise rotation of the above shaft 69 is limited only to a certain determined range of rotation angle.

Immediately after the start of clockwise rotation of the shaft 69 starting from the position shown in FIG. 1, the reset cam 72 removes the spring pressure by a spring 73. Subsequently to it, the fore end 71a of the cam 71 pushes one end 102a of a release lever 102. But, the lever 102 can not rotate counter-clockwise about a pin 73 fixed on a holding lever 75. The reason for this is that another arm 102b of the lever 102 is in contact with a pin 74 fixed on the lever 75. Therefore, the lever 102 is rotated counter-clockwise about a pivot 77 together with the lever 75 against the biasing force of a spring 76.

In the shown embodiment, a lever 79 interlocked with the aperture stop mechanism of lens tube 78 is biased downward. The lever 79 abuts against the free end 80a of a diaphragm regulating lever 80 to prevent the downward movement of the lever 79. In this position, the aperture is at the maximum value. A pin 81 on the lever 80 is in engagement with the hook portion 75a of the lever 75. As the lever 75 is rotated counter-clockwise as described above, the pin 81 is disengaged from the hook portion 75a of the lever 75. Thus, the lever 80 is allowed to rotate clockwise about the axis 84 (the free end 84 moves down) under the action of the lever 79 and spring 82. From this time point, the lever 80 rotates clockwise about the rotation axis 84 following the cam 71 now in contact with another pin 83 on the lever 80. As the cam 71 rotates clockwise starting from the position shown in FIG. 1, the amount of lift by the cam gradually decreases with the rotation of the cam and the free end 80a of lever 80 contacted by the lever 79 gradually moves down so as to stop down the aperture.

The quantity of light passed through the lens is being measured by a photo receptor unit 181 as shown in FIG. 6. When the measured quantity of light reaches a proper value calculated from the given data of the set shutter speed, film sensitiveness, etc., the diaphragm control circuit 182 applies current to a coil 85. Until this time point, a permanent magnet 86 holds an armature 88 on a yoke 87 by the magnetic attraction force. Upon the application of current to the coil 85, the attraction force is reduced for a moment and the biasing force of a spring 89 overcomes the attraction force. Consequently, a diaphragm locking pawl 90 on which the armature 88 is fixed, is rotated counter-clockwise about a pivot pin 91 by the spring 89. The locking portion 90a of the pawl 90 comes into engagement with an enlargement gear train 93 to lock it against rotation. The enlargement gear train 93 is constituted of gears 93a, 93b and 93c. The gear 93c is integrally connected with the lever 80. Therefore, the lever 80 is stopped rotating and an aperture value for the most proper exposure is set thereby. The enlargement gear train 93 is provided to increase up the resolving power of aperture value setting thereby improving the accuracy of aperture value setting.

The system moved interlocking with the engaged worm 58 and gear 60 is referred to as shutter charge system. The operation of the shutter charge system during the above operation of other systems will be described hereinafter.

With the forward rotation of the motor 30 and at the same time as the clockwise rotation of the gear 59, the gear 60 starts rotating in the direction of arrow. The shaft 105 on which the gear 60 is fixed and a gear 106 fixed on the shaft 105 also rotate counter-clockwise. A gear 107 in mesh with the gear 106 rotates clockwise. An opening blade charging gear 109 integrally connected with the gear 107 through a shaft 108 also rotates clockwise.

In the course of clockwise rotation, the gear 109 comes into engagement with a sector gear 110 and the engagement continues for a while during which the sector gear 110 is rotated counter-clockwise. At the end of the sector, the engagement between the gears 109 and 110 goes out and thereafter only the gear 109 continues further rotating clockwise. The clockwise rotation of the gear 109 is stopped when the rotation limiting disk 61 in the film feeding system and the locking pawl 62 come to engagement with each other.

On the other hand, the sector gear 110 disengaged from the charge gear 109 is returned back to the position shown in FIG. 1 by the biasing force of a spring 111. In this manner, at first the sector gear 110 rotates counter-clockwise about a pin 112 standing from an arm 113 and during the rotation of the gear 110 the arm 113 mounted coaxially with the gear 110 is rotated counter-clockwise by a pin 114 on one end of the sector gear 110. The hook portion 113a of the arm is brought to a position engageable with a pawl 116. The sector gear 110 has another pin 117. With the counter-clockwise rotation of the gear 110 the pin 117 pushes a spring 118 by which the pawl 116 is rotated clockwise. The pawl 116 has an armature 119 fixed thereto. With the clockwise rotation of the pawl 116, the armature 119 is pushed against a yoke 120. After that, the armature is held on the yoke by the attraction of a permanent magnet 136 against the biasing force of a spring 137. In this attracted position of the pawl 116, the engagement between the hook 116a of pawl 116 and the hook 113a of arm 113 is maintained against the force of an opening blade driving spring not shown. Thus, the system gets in the position completely prepared for opening blade running. Designated by 123 is a sub-arm which cooperates with the arm 113 to support the opening blade 115.

115' is a closing blade and 107' is a gear corresponding to the above gear 107. The mechanism for charging the closing blade 115' is essentially the same as the above described opening blade charging mechanism. The members of the closing blade charging mechanism functionally corresponding to those of the above described opening blade charging mechanism are designated by like reference characters with prime affixed. The operation of the closing blade charging mechanism from the rotation of the gear 107' in the direction of arrow to the completion of preparation for closing blade running is entirely the same as the above described operation of the opening blade charging mechanism. Therefore, the operation of the closing blade charging mechanism need not be further described.

The operation for charging the shutter described above is an example of known shutter charging operations. This shutter charging is carried out mainly during the operation time for stopping down the aperture. In other words, the effect of speed reduction for improving the accuracy of diaphragm control is attained by this shutter charging itself. The operations described above are operations to be done during the forward rotation of the motor 30.

During the above process of aperture stop-down, a shaft 125 also continues to rotate counter-clockwise because gears 70 and 124 are always in mesh. The shaft 125 is used to drive a reflux mirror. In view of cost as well as arrangement of parts it is generally preferable to dispose the light measuring unit 181 optically behind the reflex mirror relative to the lens. In such arrangement it is undesirable to move the mirror during the measurement of light. For this reason, the camera is conventionally designed in such manner that between aperture stop-down and mirror-up there is provided a difference in time and the reflex mirror is moved up after the completion of aperture setting. In the shown embodiment, this requirement is satisfied by the following mechanism.

With the counter-clockwise rotation of the shaft 125, a first arm 126 on the shaft also rotates counter-clockwise. The first arm 126 has a stud 127 at its free end. The stud also rotates counter-clockwise about the shaft 125. Rotatably mounted on the stud 127 is a second arm 128. With the counter-clockwise rotation of the stud 127, the fore end 128a of the second arm 128 is moved to the left from the position shown in FIG. 1. The second arm 128 has a stud 129 at the base part 128b of the arm. The stud 129 is half enclosed by a semi-circular cross-section enclosure part 126a projecting from the first arm 126. Therefore, although the fore end portion 128a of the second arm moves to the left, the stud 129 on the base part 128b can not move to the left but is held in the position by the half-opened enclosure part 126a of the first arm. Consequently, the second arm 128 rotates together with the first arm 126 counter-clockwise about the shaft 125. A third arm 130 pivotally mounted on a stud pin 129 remains unmoved. The length of the arms 126 and 128 and the shape of the half-opened enclosure part 126a are selected in such manner that the shaft 125 and the pivot 129 can be coaxial. Therefore, the mirror supporting frame 132 connected with the third arm 130 through a pin 131 does not rotate about its rotation axis 64 at this phase of operation.

Figure 4:
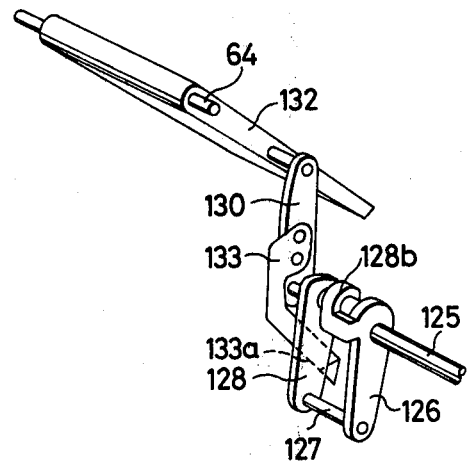
FIG. 4 is a perspective view showing the step of moving down the mirror shown in FIG. 1.

After the shaft 125 has rotated by a certain rotation angle as required for stopping down the aperture (about 180 degrees), the pawl portion 133a of a leaf spring 133 fixed to the third arm 130 catches the second arm 128 so that the second and third arms 128 and 130 get in engagement with each other as shown in FIG. 4. Therefore, from this time point the two arms 128 and 130 work like a single arm and function as a rod. The first arm functions as a crank rotating about the shaft 125 and the stud 127 functions as a crank pin. As a result of this crank motion, the supporting frame 132 is lifted up. At the time, the movement of the pivot 129 is never limited because of the half-opened structure of the enclosure part 126a. In brief, the supporting frame 132 remains stationary during the first half rotation of the shaft 125 and it is moved up during the second half rotation of the shaft. The gear ratio of gear 70 to gear 124 is so determined that the first arm 126 can rotate up to the position in which the first arm is nearly in alignment with the second and third arms 128 and 130. This is the time when the rotation limiting disk 61 and the locking pawl 62 in the film feeding system get in engagement.

Figure 5:
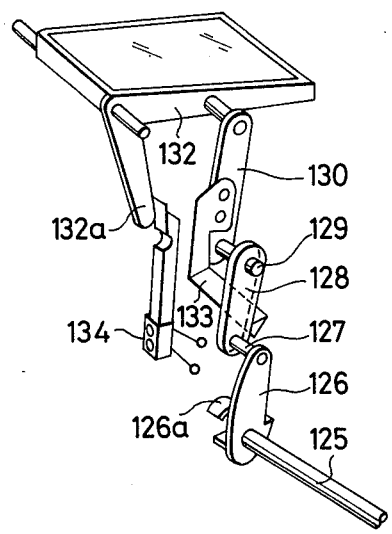
FIG. 5 is a perspective view of moving down the mirror.

FIG. 5 shows the mirror in the elevated position. In this position, an arm 132a integrally formed with the frame 132 pushes a mirror stop switch 134 ON. In response to the stop signal, the control circuit 185 stops the motor 30. Although not shown in the drawing, the motor 30 is provided with a slip mechanism through which the motor can slip when the rotation of the motor is stopped by any external force. Such slip mechanism is well known as an accessory mechanism to motor driven cameras and need not be further described.

The arms 128 and 130 may be buckled in the direction to move the axis 129 to the right if they are held in the position shown in FIG. 5 for a long time. To eliminate the possibility of buckling it is desirable to make the leaf spring 113 have such biasing force intending to push the leaf spring against the backside surface of the second arm 128. By doing so, there is a frictional force between the backside surface of the second arm and the surface of the leaf spring which has an effect to prevent such buckling of arms.

In the manner described above, the reflex mirror is retracted from the optical path after stopping down the aperture to a desired value from the maximum aperture. Thus, the apparatus is now in the position ready for shutter operation.

To operate the shutter, current is applied to the coil 135 in good timing. Thereby the attraction force of the permanent magnet 136 is reduced for a moment and the force of the spring 137 overcomes the attraction force holding the armature 119 on the yoke 120. The pawl 116 starts to rotate counter-clockwise under the action of the spring and the hook portion 113a of the arm 113 is disengaged from the hook portion 116a of the pawl 116. Therefore, the opening blade 115 starts running under the force of a opening blade driving spring not shown. Subsequent to it and in good timing for obtaining the set shutter speed, current is applied to the coil 135'. In the same manner as that for the above opening blade, the closing blade 115' starts running. At the beginning or near the end of the running of the closing blade, an arm 113'a of the arm lever 113' comes to contact with the switch 138 to turn it from OFF to ON.

In response to the signal from the switch 138, the control circuit 185 reverses the motor 30 at once or after a suitable time lag. Therefore, the motor 30 starts to rotate in the direction opposite to the arrow in FIG. 1. With the rotation of the motor in the reversed direction, the mirror is returned to its working position and the aperture is again opened up to its maximum value. All of the parts of the apparatus are returned back to the position shown in FIG 1.

Returning of the mirror is performed in the following manner:

As the motor 30 rotates in the reversed direction, the gear 59 rotates counter-clockwise. This rotation of the gear 59 is transmitted to gears 70 and 124 to rotate the shaft 125 and the first arm 126 clockwise. Therefore, the second and third arms 128 and 130 are pulled downward so that the mirror frame 132 moves down from the elevated position shown in FIG. 5. When the first arm 126 has rotated up to the position facing down, its half-opened enclosure part 126a catches the stud 129. From this time, the first and second arms 126 and 128 execute a coaxial motion about the shaft 125 and are returned to the position shown in FIG. 1. The frame 132 is no longer moved. In the process of returning mirror, therefore, the frame 132 moves down during the first half clockwise rotation of the shaft 125 and it remains stationary during the second half rotation. Even if the shaft 125 rotates clockwise many times in this position, the frame 132 remains stationary. The pawl part 133a of the leaf spring 133 has a tapered portion 133a provided at the rear side of the pawl part. Because of the tapered portion 133b, the pawl part 133a can displace and escape from the second arm 138 when it comes to contact against the leaf spring 133. Therefore, the third arm 130 is never driven into rotation in the shown position and the frame 132 remains stationary no matter how many times the shaft 125 may be rotated clockwise in the shown position.

The aperture is opened in the following manner:

With the counter-clockwise rotation of the gear 59, the aperture setting cam 71 also rotates counter-clockwise while gradually increasing the amount of lift. Accordingly, the pin 83 is moved up and the aperture control lever 80 rotates counter-clockwise to move the lever 79 upward. Thus, the aperture of lens 78 is opened up to the maximum value. With the counter-clockwise rotation of the lever 80, the holding lever 75 rotates clockwise by the biasing force of spring 76. The hook portion 75a holds the pin 81 of the lever 80 so as to maintain the opened state of the aperture. When the cam 71 rotates counter-clockwise, its end 71a pushes up one end 102a of the releasing lever 102. But, this motion does not cause the lever 75 to rotate counter-clockwise. Only the lever 102 is rotated clockwise against the force of spring 141. Therefore, the aperture is kept in the fully opened state no matter how many times the cam 71 may be rotated counter-clockwise.

With the counter-clockwise rotation of the lever 80, the enlargement gear train 93 also rotates. In this direction of rotation, the pawl part 90a of the locking pawl 90 does not lock the gear 93a against rotation because of the particularly selected form of the pawl portion 90a. If the noise and load generated from this portion produces any problem, then it is advisable that the locking pawl 90 be rotated clockwise away from the gear 93a at a suitable time point after picture taking and before returning the aperture back to the opened state. During the counter-clockwise rotation of the gear 59 and therefore the shaft 69, the cam 72 also rotates in the same direction. In the course of this rotation of the cam 72, it pushes the spring 73 whereby the armature 88 is brought into contact with the yoke 87 which holds the armature in the position by the magnetic attraction force.

In the manner described above, according to the shown embodiment, the motor 30 is reversed after exposure to rotate the shaft 69 counter-clockwise by which the mirror is returned to its working position in the optical path and also the lens aperture is returned to the fully opened state. The motor can be further rotate in the reversed direction while maintaining the above position of the apparatus.

The manner of operation of the shutter charging system after exposure is as follows:

At the start of rotation of the motor 30 in the reversed direction after exposure, the gear 60 starts rotating in the direction opposite to the arrow to rotate the charge gear 109 counter-clockwise. After engaging with the sector gear 110, the charge gear 109 rotates the sector gear 110 clockwise about axis 112 against the force of spring 111. In this direction of rotation, the pin 114 on the gear 110 moves away from the arm 113. Therefore, the arm 113 remains stationary. Similarly, the arm 113' remains stationary.

After the charge gear 109 is disengaged from the sector gear 110, the latter is rotated counter-clockwise by the spring 111 and returned to the position shown in FIG. 1. In the same manner, the sector gear 110' is returned back to the starting position by the action of the spring 111'. The shutter charging system no longer responds to the rotation of the motor 30 in the reversed direction after exposure however often the motor may be rotated in the reversed direction.

The operation of film feeding system after exposure is as follows:

After exposure, the motor 30 and therefore the pinion 32 rotate in the reversed direction. The gear 37 is rotated counter-clockwise through the reduction gear train. The stud pin 37a of the gear 37 pushes the arm 65a of the lever 65 to rotate it clockwise. The pin 68 depending from another arm of the lever 65 pushes the arm 56a of the intermediate lever 56 to rotate it counter-clockwise. As a result, the other arm 56b of the lever 56 pushes the pin 9e on one end of the lever 9 to rotate it clockwise. With this clockwise rotation of the lever 9, the hook portion 9b is disengaged from the notch 12a of the limiting disk 12. Thus, the disk becomes rotatable. In this manner, the limitation of film take-up can be surely released by the rotation of the motor. This state released from take-up limitation is maintained by the engagement between the force end 9d of the lever 9 and the fore end 53a of the lever 53.

With the above counter-clockwise rotation of the gear 37, the rotation limiting disk 61 starts rotating counter-clockwise from the position engaged by the locking pawl 62 and also the film feed plate 39 rotates in the same direction. When the projection 39a on the plate 39 and the hook portion 40a of the film feeding pawl 40 come into engagement as shown in FIG. 1, the gear 42 starts to rotate counter-clockwise. With the rotation of the gear 42, the spool 29 rotates in the direction of arrow through the friction mechanism 43. The rotation of the gear 42 is transmitted also to the gears 44 and 45. The sprocket shaft 47 rotates counter-clockwise through the engagement of slot 45a and pin 47a. Therefore, the film moves forwards.

A short time after the start of the film feeding, the recessed portion 12c of the disk 12 leaves the pin 53b on the holding lever 53 and instead the maximum outer-diameter portion 12b comes into contact with the pin 53b whereby the lever 53 is rotated counter-clockwise about the axis 54 by spring 55 to unlock the end 9d of the lever 9. By it the holding of the released position from the take-up limitation is removed. The lever 9 rotates counter-clockwise under the action of spring 52 and the hook portion 9b of the lever 9 comes into contact with the maximum diameter portion 12b of the limiting disk 12.

In the course of the rotation of the disk 12, its notch 12a comes to the position opposite to the pin 43b of the lever 53. But, the pin 53b does not engage in the notch 12a to lock the limiting disk 12 against rotation. The reason for this is that the pin 53b is rounded and the clockwise rotation of the holding lever 53 is limited by the end 9d of the lever 9 within a limited range.

When the disk 12 has rotated up to the position in which the notch 12a is against the hook 9b of the lever 9, the hook engages in the notch to lock the disk against rotation. Thus, the feed of film is stopped and the film take-up in a frame amount of film is completed at this time point. At the same time, the arm 9a of the rotating lever 9 pushes the contact of switch 10 to turn it OFF. In response to the signal, the motor control circuit 185 stops the motor 30 rotating in the reversed direction.

During the above operation, the gears 50 and 51 on the sprocket shaft 47 continue to rotate. The feed pawl 25 moves to the left to advance the ratchet wheel 17 in one tooth amount by the pawl portion 25b. Thereby, the frame number dial 20 is advanced by one number of step relative to the indication mark 24. At the returning of the feed pawl 25 to the right, the engaging portion 13a of the locking pawl 13 prevents the ratchet 17 from moving backwards.

During the above film feeding operation, all of the diaphragm driving system, shutter charging system and mirror driving system are moving idle.

The above sequence of operations for picture taking and film feeding is repeated every time of picture taking which is started by pushing the button 100.

After all of the frames of a film have been exposed for taking pictures, the film is rewound. The film rewinding operation is as follows:

The operator pushes the rewinding button 7 upward. The sprocket shaft 47 normally biased downward is pushed up by it. One end 6b of the holding lever 6 under the biasing force of a spring 139 comes in under the stepped portion 7a of the push button 7 to keep the sprocket shaft 47 in the elevated position. The upper sprocket pin 47a is therefore moved up escaping from the slot 45a on the gear 45. Now, the sprocket 49 and the sprocket shaft 47 are allowed to rotate independently of the gear 45 and the gears 44, 42 interlocked with the gear 45.

Since the gear 50 is fixed on the shaft 47, the gear 50 is moved up together with the shaft 47. In the course of this upward movement of the gear 50, its conical portion 50a rotates the lever 150 counter-clockwise about axis 152 against the biasing force of a spring 151. The shaft 152 of lever 150 has another lever 153 fixed thereto. With the counter-clockwise rotation of the lever 150, the free end 153a of the lever 153 moves to the left as viewed in the drawing.

Figure 3:
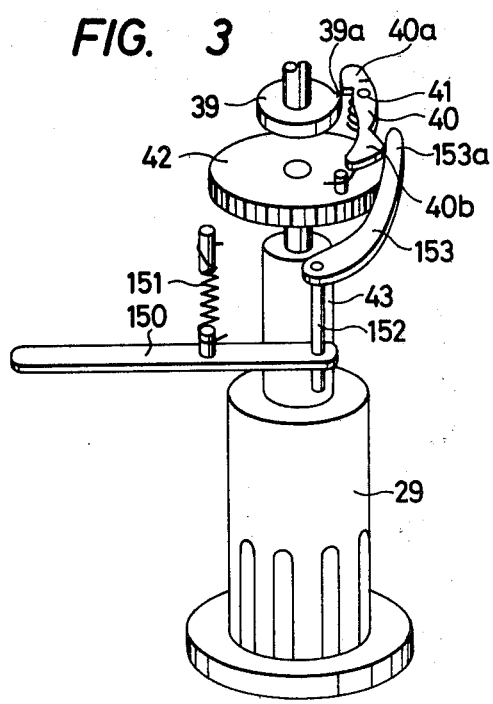
FIG. 3 is a perspective view illustrating the manner of operation of the film take-up spool.

After pushing the rewinding button 7 up, the operator turns a rewinding operation lever 155 about 90° clockwise. A cam 157 connected with the operation lever 155 through a shaft 156 is rotated the same angle by the operation lever. A shaft 158 in contact with the cam 157 under a biasing force lifts up with the rotation of the cam 157. The shaft 158 is supported by a pulley 159 for up-and-down movement through a pin 158a and a slot 159a. A fork 161 is provided on the top end of the shaft 158. When the shaft 158 lifts up, the fork 161 gets engageable with the spool of a film magazine not shown. The cam 157 rotated clockwise also pushes a switch 162 to turn it ON. In response to the signal, the control circuit 185 starts the motor 30 rotating clockwise. The film feed plate 39 is rotated counter-clockwise together with the gear 42. By the next push-up of the rewinding button 7, the film feed plate 39 is disengaged from the film feed pawl 40. When the whole film is completely taken out from the magazine, the rewinding button 7 is pushed up and the free end 153a of the above described lever 153 is turned to the left. At this time point, the projection 40b of the film feed pawl 40 is not always in the position opposite to the free end 153a of the lever 153 because it is not seldom that the film take-up operation just before the film rewinding operation has been ended in the phase of the middle of a frame. However, when the film feed plate 39 is rotated counter-clockwise by the above rewinding operation, the projection 40b can be pushed by the free end 153a of the lever 153 within one revolution of the plate 39. When the projection 40b is pushed by the free end 153a of the lever 153, the hook portion 40a of the film feed pawl is moved rightward and disengaged from the projection 39a of the feed plate 39. FIG. 3 shows this disengaged state of the members.

On the other hand, since the gears 37 and 163 are always in mesh with each other, the shaft 164 and the pulley 165 rotate clockwise with the counter-clockwise rotation of the gear 37. A belt 166 extends around the pulleys 165 and 159. Between the two pulleys, the belt 166 is given a suitable tension by a roller 167. Therefore, when the pulley 165 rotates clockwise, the pulley 158 rotates also in the same direction. Also, the shaft 158 having the pin 158a rotates in the same direction through the pin 158a slot 159a engagement. By this rotation of the shaft 158, the spool of the film magazine not shown is rotated through the fork 161 to rewind the film around the spool.

As previously noted, the sprocket 49 is reversible at this phase of operation. The spool 29 is made reversible by the slip of the friction mechanism 43, which is the same as the conventional mechanism.

After completing the rewinding the film, the operator turns the rewinding lever 155 back to the position shown in FIG. 1. With this motion, the fork 161 moves down and the switch 162 is turned OFF. The control circuit 185 stops the motor 30. A check pawl 189 is provided to prevent the gear 42 from being rotated by the curling force of the film 28 or at the rewind of the film. In this manner, the film rewinding is completed. After that, the operator can open the back lid of the camera and take out the film magazine.

The manner of operation for multi-exposure is as follows:

The multi-exposure instruction is given to the camera before the first exposure because the camera is always stopped in the state of film feed end. To give the multi-exposure instruction, a multi-exposure lever 171 is rotated clockwise. Thereby the shaft 172 and lever 173 are rotated clockwise together. The free end 173a of the lever 173 comes into contact with a pin 174. The lever rotating clockwise pushes the arm 65b of the releasing lever 65 to rotate it counter-clockwise against the force of the spring 66. The lever 65 is held in the position by a holding mechanism not shown. Therefore, the other arm 65a of the lever 65 is retracted from the position engageable with the pin 37a on the gear 37 so that the lever 9 can not be rotated clockwise through levers 65 and 56. After the multi-exposure command has once been given in the above described manner, the limiting disk 12 does not become rotatable even in the returning course of the mirror with the clockwise rotation of the motor by a determined rotation angle after exposure, that is, after the end of the closing blade running. The reversed rotation of the motor and therefore the counter-clockwise rotation of the gear 37 are locked mechanically at the time of the engagement of the film feed plate 39 with the film feed pawl 40. Therefore, there is no further film feeding by the inertia of the motor 30. In this point, the operation for multi-exposure is different from the operation of the ordinary picture taking described above. In the later case, the pin 37a has rotated the lever 65 clockwise in the course of mirror return, and the lever 9 has been rotated clockwise through the lever 9 to unlock the disk 12.

Current applied to the motor 30 is cut off by turn-ON of a multi-exposure stop switch 178. The switch 178 is turned ON when the lever 176 is rotated counter-clockwise about a shaft 177 by the pin 37a on the gear 37 and before the engaging portion 39a of the feed plate 39 comes into engagement with the hook portion 40a of the pawl 40. Turn-ON of the stop switch 178 is detected by the control circuit 185 which then cuts off the current supply to the motor 30.

For the ordinary picture taking mode described above, the motor control circuit 185 controls the operation of the motor 30 in such manner that the motor starts rotating in the reversed direction when the switch 138 is turned ON in relation to the shutter operation and the current to the motor 30 is cut off when the switch 10 is turned OFF at the completion of film feed after the switch 10 has once been turned ON with the returning movement of the mirror. In contrast, for the multi-exposure taking mode, the switch 10 remains OFF even at the returning movement of the mirror. The control circuit 185 stops the motor 30 when the switch 10 is OFF and the switch 178 is ON. In this manner of operation, the first exposure is completed.

To carry out the second exposure subsequent to the above first exposure, the multi-exposure operation lever 171 is rotated counter-clockwise to the starting position manually or automatically through a known interlocked mechanism with the operation of the first exposure. By this counter-clockwise rotation of the operation lever 171, the releasing lever 65 is rotated clockwise under the biasing force of the spring 66 and returned back to the starting position shown in FIG. 1. Now, the above described operation is performed for the second exposure. After feeding the film in one frame amount, the apparatus is stopped. Triple or more multiple exposure can be performed in the same manner as above.

FIG. 6 is a circuit diagram showing the mutual relation and arrangement of switches, motor control circuit 185, diaphragm control circuit 182 and shutter control circuit 184. These have already been described in detail in the above and therefore need not to be further described. 191 is a diaphragm, 192 is a power source and 193 is a power source switch. Although not shown in FIG. 1, the diaphragm 191 is disposed in the lens tube 78 and operated by the lever 79. The power source 192 is located in a suitable position within the camera. The power source switch 193 is also suitably positioned within the camera and is thrown in the circuit before taking a picture.

Figure 7:
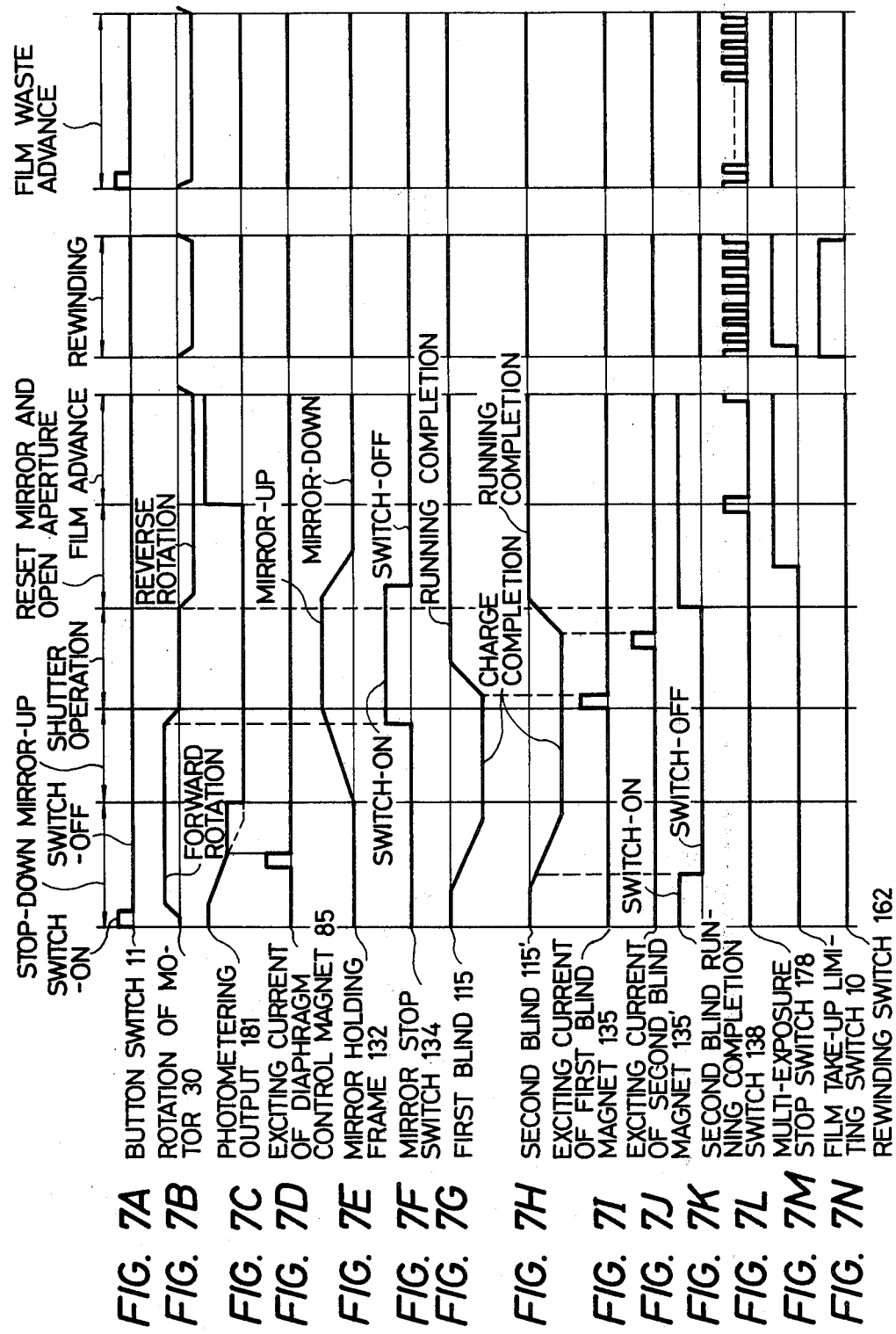
FIGS. 7A-7N are a timing chart of the operation of the camera.

The above described operations of the respective systems related with the respective operations of the switches are summarized in FIG. 7 as a timing chart.

In the timing chart shown in FIG. 7, the high level of diagram relating to button switch 11 means switch-ON and the low level does switch-OFF. As for motor 30, the base line means that the motor is stopping. High level above the base line means forward rotation thereof and low level does the reversed rotation. Diagram of photometering unit 181 indicates the output level thereof. Diagram of coil of diaphragm control magnet 85 indicates the value of current. Diagram of mirror supporting frame 132 shows mirror-up and mirror-down. In the diagram of mirror stop switch 134, the high level means switch-ON and the low level does switch-OFF. In the diagram of opening blade 115, the base line means the end position of running. The downward direction is the direction for charging. This is the same as to the closing blade 115'. Diagram of coil of opening blade magnet 135 represents the current to it. The same is supplied to the diagram of the closing blade magnet 135'. In all the diagrams of closing blade running end switch 138, multi-exposure stop switch 178, take-up limiting switch 10 and rewinding switch 162, the high level is switch-ON and the low level is switch-OFF.

Hereinafter, the operation sequence of picture taking with the above embodiment will be summarized with reference to the timing chart shown in FIG. 7.

After setting the film counter to "1", the operator determines an object to be taken and then turns the switch 11 ON. The motor starts forward rotation to drive the diaphragm driving system and shutter charging system. Thereafter, the mirror driving system is driven to move up the mirror supporting frame 132 to the taking position from the observing position. With the upward movement of the mirror supporting frame 132, the switch 134 is turned ON to stop the motor 30. The charged opening blade 115 and closing blade 115' run to effect exposure at which time the exciting current of magnets 135 and 135' is ON.

At the completion of running of the closing blade 135', the switch 138 is turned ON to start the motor 30 rotating in the reversed direction. The mirror supporting frame 132 is moved down by it. At the same time, the aperture is fully opened again. The motor 30 continues to rotate in the reversed direction to drive the film take-up system for feeding the film by one frame. During the time, the diaphragm driving system, shutter charging system and mirror driving system all remain undriven. The rotation of the motor 30 in the reversed direction is stopped by turn-OFF of switch 10.

After all of the frames of the film have been exposed for picture taking, the button 7 is pushed to disengage the pin 47a from the slot 45a and disconnect the film take-up system from the motor 30. The rewinding coupling 161 is brought into engagement with the film magazine. For rewinding, the switch 162 is turned ON and the motor 30 rotates in the reversed direction to take the exposed film into the magazine. At the completion of rewinding, the switch 162 is turned OFF to stop the motor 30. In multi-exposure mode, the rotation of the motor 30 in the reversed direction is stopped when the switch 178 is turned ON. The subsequent steps to it are all cut out.

In the above shown embodiment, the cam 71 is driven by the driving force of the motor 30 to stop down the aperture. However, instead of the motor, a spring may be used to stop down the aperture. In this case, the spring rotates the shaft 30. It is also possible to omit such particular driving spring for stop-down and make use of the biasing force of the existing spring 82 for stop-down. In this case, not the cam 71 but a shutter charging member is brought into contact with the pin 83 for effecting the stop-down of the aperture. It is the essential feature of the invention to use the work necessary for charging the shutter also for reducing the speed of the aperture stop-down. Therefore, the present invention is applicable not only to a motor driven type of camera but also to a spring motor driven type of camera and a common manual film take-up and diaphragm control type of camera with substantially the same effect of the invention.

While a vertical running blade type of shutter has been particularly shown in FIG. 1, it is to be understood that the present is applicable also to such apparatus provided with a vertical running winding-up type of shutter, a horizontal running winding-up type of shutter or so-called lens shutter.

If the power for charging the shutter is too large to obtain therefrom a suitable degree of reduction effect, the aimed proper reduction effect can be obtained by suitably changing the gear ratio of the sector gear 110 to the charge gear 109 and also the gear ratio of the sector gear 110' to the charge gear 109' so as to charge the shutter making use of also the area for lifting the area after completing the stop-down.

In other particular type of shutter, for example, in such type of shutter provided with a particular control member by which the trigger switch serving as the reference point for counting time in second to control the shutter is switched over prior to the running of the opening blade and by which the opening blade is started, the work to charge the driving spring for it may be used for the purpose of speed reduction according to the invention.

Hereinafter, a second embodiment of the invention will be described with reference to FIG. 8. In the second embodiment, the work to charge the mirror driving spring is used as load for speed reduction. For the sake of simple illustration, a large number of members corresponding to those in the above first embodiment in function and position are omitted in FIG. 8. Like characters to FIG. 1 represent the same or corresponding elements.

Operations for opening the back lid of the camera and for idle film feeding are entirely the same as in the above first embodiment and therefore need not be further described.

During the idle film feeding, the motor 30 rotates clockwise and the gear 59 rotates counter-clockwise a plural number of turns. With the rotation of the gear 59, the stop-down cam 71 rotates also counter-clockwise and comes to contact with the pin 83. However, in this direction of rotation, the contact between the cam 71 and the pin 83 does not produce any problem because the rotation direction of the cam is the direction for increasing the cam lift.

As the gear 59 is integrally connected with a gear 270 by the shaft 69, a gear 294 in mesh with the gear 270 rotates clockwise. The shaft 225 on which the gear 294 is fixedly mounted, and a cam 296 on the shaft 225 also rotate clockwise. A roller 297 is in contact with the cam 296 and has a mirror charging lever 298 integrally connected with the roller. Therefore, with the rotation of the cam 296, the lever 298 swing moves about its pivot 290 a plural number of swings following the cam 296. The swing lever 298 has a pin 300 at another end of the lever. In the area of the cam having a larger cam lift, therefore, the pin 300 charges the spring 299 whereby the biasing force of the spring intends to rotate a lever 201 counter-clockwise about its rotation axis 270 through a pin 280. However, the lever 201 is locked against counter-clockwise rotation by a lock lever 202 which is in engagement with one arm 201a of the lever 201 at the hook portion 202a of the lock lever 202. Therefore, the spring 299 repeats expansion and contraction with the rotation of the cam 296. In this connection it is to be noted that there is caused almost no mechanical loss by the expansion and contraction of the spring 299.

During the above rotation of worm gear 58, the gear 60 also rotates clockwise a plural number of turns.

Therefore, the shaft 105 and a crank arm 306 are rotated in the same direction. As a result, the shutter charging lever 310 is reciprocally moved up and down by a crank motion known per se through the pin 308, rod 307 and pin 309. Thus, the shutter is charged. If shutter charge has not been effected yet at the time of taking out the exposed film from the camera, charging of the driving spring is effected at this time point.

In the shown embodiment, when the charging lever 310 is in its elevated position, the shutter 311 is in the state completely charged. When the charge lever is in its lowered position, the shutter 311 is allowed to operate. Details of the structure of the shutter are not shown in the drawing because the structure is of a conventional type well known to those skilled in the art no matter whether it is a focal plane shutter or a lens shutter.

By the above operation, the camera is prepared for the exposure on the first frame of the film. Operation for picture taking and operation for taking up the film following the picture taking (taking sequence) are essentially the same as described above in the first embodiment. Therefore, no further description thereof is necessary. During the taking sequence, the motor 30 starts rotating counter-clockwise.

Operation of the diaphragm control system is as follows:

With the clockwise rotation of the gear 59, its shaft 69, the aperture control cam 71 and the gear 270 on the shaft 69 rotate in the same direction. The fore end 71a of the cam pushes one end 102a of the lever 102 to rotate it counter-clockwise about the axis 77 together with the lever 75 against the force of the spring 76.

With the counter-clockwise rotation of the lever 75, the stud pin 281 on the lever 280 is disengaged from the hook portion 75a of the lever 75. The lever 280 starts rotating clockwise under the biasing force of spring 82 and the biasing force of the diaphragm interlocking lever 79 transmitted through a pin 381. The pin 381 is fixed on a diaphragm control lever 380. As shown in FIG. 8, the pin 381, before starting a picture taking operation, is in contact with the lever 280 under the biasing force of spring 282 and the downward biasing force of the lever 79.

The levers 380 and 280 are rotated gradually clockwise about the axis 84 by the cam 71 in contact with the pin 83 on the lever 280 so as to gradually stop down the aperture.

The quantity of light transmitted through the lens is continuously measured by a known light measuring element not shown. In the manner described above, the lever 380 is stopped by a locking mechanism when the measured quantity of light reaches a certain desired level thereby setting an aperture value. The locking mechanism for stopping the lever 380 is entirely the same as the mechanism including the members 85 to 93 in FIG. 1. Interlocking motion with the locking mechanism is caused by a sector gear part 380b provided on the lever 380. The mechanism for this is entirely the same as in the first embodiment and therefore not shown in FIG. 8.

Although the lever 380 is stopped in the manner described above, the lever 280 continues further rotating clockwise following the cam 71 and under the action of the spring 82. When the lever 280 rotates clockwise up to a rotation angle beyond the position corresponding to the minimum aperture of the lens, one end 280a of the lever 280 pushes a pin 204 upwardly as viewed on FIG. 8. Thereby, the lock lever 202 is rotated clockwise about the pivot 203 against the biasing force of spring 205. The hook portion 202a of the lock lever 202 is disengaged from one end 201a of the lever 201. Since the gears 270 and 294 are always in mesh with each other, the shaft 225 and therefore also the cam 296 continue rotating clockwise over the whole course of aperture stop-down up to this time point.

Therefore, as previously mentioned, the spring 299 is charged during the aperture stop-down. As a result of it, a load is applied to the shaft 225, which has an effect to reduce the speed of aperture stop-down. By suitably determining the shape of the cam 71, the lever 202 can be rotated clockwise when the cam follower roller 297 comes into the maximum lift area 296a of the cam 296. At the time, the mirror supporting frame 132 is rotated counter-clockwise away from the taking optical path by one arm 201b of the lever 201 through a pin 301. The force of the spring 206 biasing the mirror downward is so set as to be weaker than the force of the spring 299 biasing the mirror upward. Subsequent to the setting of the lens aperture, the elevation of the mirror is performed in this manner.

During the above operation, the shutter charging system moves interlocking with the gear 60. With the rotation of the shaft 105, the crank 306 is rotated to the lower position in FIG. 8 and therefore the shutter charge lever 310 is set to the undermost position. At the time, operations necessary prior to shutter operation are all over.

In good timing, a signal is applied to the opening blade releasing electromagnetic device and the closing blade releasing electromagnetic device to perform exposure with a determined shutter time in second. After exposure, the motor 30 starts rotating clockwise in response to a signal interlocked with the closing blade of the shutter 311.

With the rotation of the motor 30 after exposure, the diaphragm control system operates in the following manner:

The cam 71 rotates counter-clockwise to rotate the lever 280 counter-clockwise. Thus, the aperture is again fully opened.

In the mirror driving system, the lever 298 starts to rotate counter-clockwise with the clockwise rotation of the cam 296. One end 298a of the lever 298 comes into contact with one end 201b of the lever 201 whereby the biasing force of the spring 299 becomes an internal force in substance. Under the force of the spring 206 the supporting frame 132 and the lever 201 rotate clockwise until the frame is stopped by the stopper 207. Thus, the mirror is returned to the position to give the finder viewfield.

Figure 8:
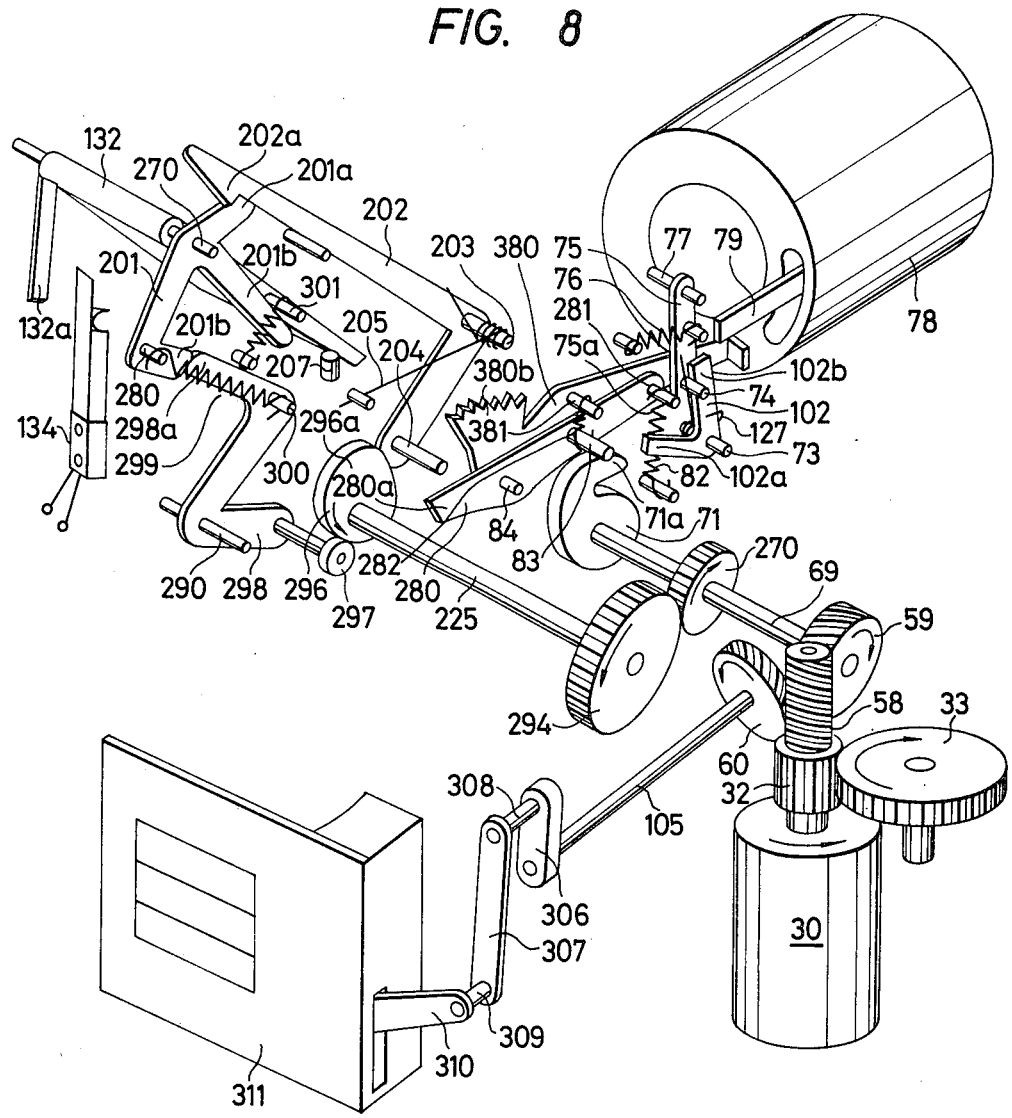
FIG. 8 is a perspective view showing a second embodiment of the invention.

In the shutter charging system, the crank arm 306 moves up again to the upper position shown in FIG. 8 with the clockwise rotation of the shaft 105. The shutter charge lever 310 is moved to the uppermost position through pin 308, rod 307 and pin 309. Thus, the shutter is charged.

After completing the opening of aperture, returning of mirror and charging of shutter, the operation for feeding the film is started. The manner of operation of film feeding is entirely the same as described in the first embodiment and need not be further described. The structure of operation circuit for this second embodiment is also the same as that of the first embodiment. In the second embodiment, there may be disposed a light measuring unit in place of the mirror supporting frame 132. In this case, the light measuring unit is kept in its working position for measuring the light during the stop-down of the lens aperture. Thereafter, the measuring unit is retracted from the optical path for picture taking. In this arrangement also, the work to operate the measuring unit can be used also as load on the aperture stop-down mechanism to reduce the speed thereof in accordance with the invention. Such a modification is shown in FIG. 9.

Figure 9:
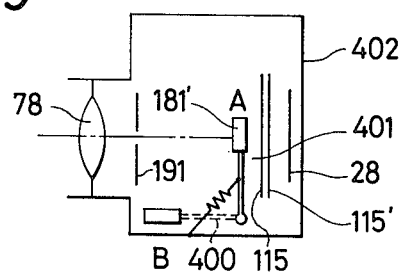
FIG. 9 is a schematic view showing a third embodiment of the invention.

In FIG. 9, a photo receptor element 181' is mounted on the free end of a lever 401 biased by a spring 400. In measuring the light, the photo receptor element 181' is held in the working position A. For taking a picture, the lever 401 is rotated by the charged spring force to bring the photo receptor element to the retracted position B from the optical path. As shown in FIG. 9, a lens 78, diaphragm 191, shutter opening blade 115 and shutter closing blade 115' are arranged within the camera body 402.

In the above embodiments of the invention, the displacement mechanisms 80 and 93 have been shown and described to be displaced together with the diaphragm interlocking lever 79 on the lens side. However, it is to be understood that the present invention is never limited to the shown embodiments only. For example, the present invention may be applied to such arrangement in which the displacement mechanism is shifted to a position corresponding to the manually or automatically preset aperture value and is locked in the position prior to the movement of the diaphragm setting lever. The diaphragm setting lever is moved afterward against the locked displacement mechanism so as to stop down the aperture to the preset value.

In the above embodiments, the crank mechanism 125-129 provided in the power transmission system extending from the output shaft of the motor to the reflex mirror has the function to enable a time-series divisional driving of various mechanisms within the camera by a motor thereby equalizing the load on the motor. In other words, the crank mechanism has been provided to efficiently utilize the driving power of the motor. In the prior art apparatus there has been usually used such gear the teeth part of which is partly cut out to equalize the load on the motor. As compared with such load equalizing mechanism accordng to the prior art, the crank mechanism in the above embodiments is excellent in durability. Furthermore, it is no longer necessary to provide a particular clutch mechanism.

Figure 10:
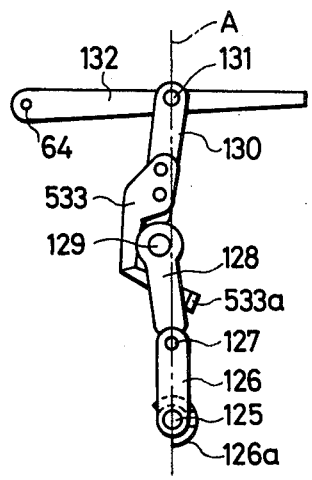
FIG. 10 is a side view of a modified mirror driving device.
Figure 11:
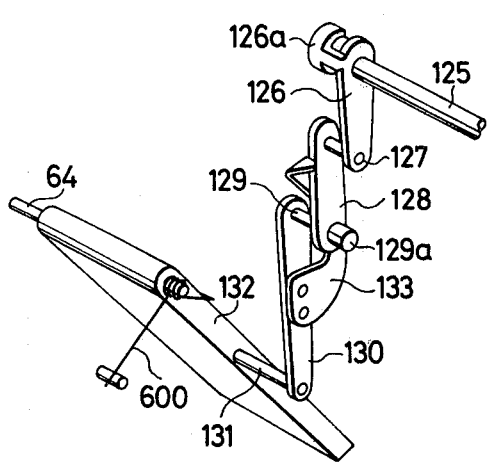
FIG. 11 shows another modification of the mirror driving device.
Figure 12:
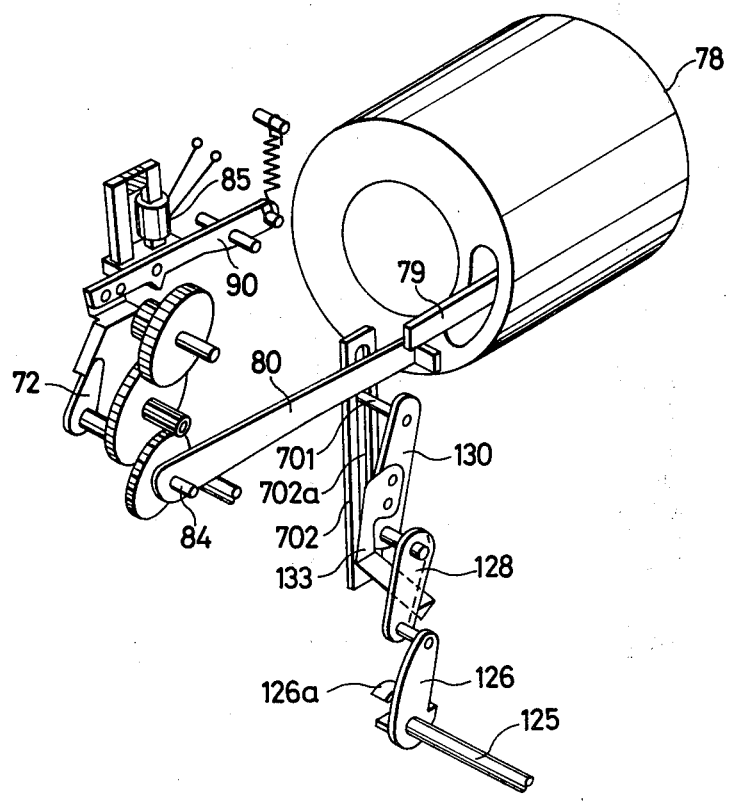
FIG. 12 is a perspective view showing a modification of the diaphragm driving device.

FIGS. 10 to 12 show various modification of the above shown third arm 130.

In the modification shown in FIG. 10, there is used a leaf spring 533 formed in such manner that when its pawl portion 533a comes into contact with the second arm 128, the shaft 129 takes a position slightly shifted from the binding line A of shafts 131 and 127 to the left as viewed on the figure. By doing so, when the driving shaft 125 rotates counter-clockwise, the second and third arms 128 and 130 get in the position upright connected together in a line forming an angle a little larger than 180° between the two arms. This has an effect to prevent buckling of the third arm 130.

In the modification shown in FIG. 11, the positional relation between arms and mirror supporting frame is selected in such manner that the mirror supporting frame 132 gets in the lowered position when the first, second and third arms 126, 128 and 130 are brought into a substantially straight line. In this arrangement, when the driving shaft 125 rotates clockwise, the mirror supporting frame 132 is rotated counter-clockwise about the axis 64 by the first arm 126 and is moved up. When the first arm 126 has rotated 180°, the frame 132 gets in the elevated position. At this time point, the projection 126a of the first arm 126 comes into contact with the head portion 129a of the shaft 129 so that the two shafts 125 and 129 become coaxial. From this time point, the frame 132 remains in the position and does not further move upward while the shaft 125 can continue rotating further. Since the driving shaft 125 is allowed to continue rotating even after lifting up the mirror frame 132, this modification can be applied, with a particular advantage, to such type of camera in which the aperture is to be stopped down after mirror up.

The embodiment shown in FIG. 11 may be mounted in the camera in the position turned upside down. In this case, a spring 600 biases the supporting frame 132 downward with a biasing force slightly larger than the gravity weight of the frame 132. By doing so, the second and third arms 128 and 130 are protected against buckling.

The same may be applied also to the modification shown in FIG. 10. Namely, a spring is provided which has a biasing force intending to move the frame 132 upward.

As shown in FIG. 12, the above driving force transmission mechanism can be used also to drive the diaphragm. In FIG. 12, the third arm 130 has a pin 701 engaged in a linear slot 702a provided on a guide plate 702. Therefore, the pin 701 is allowed to move only in the direction of the linear slot 702a. The diaphragm is controlled by rotating the diaphragm control lever 80 about the pivot 84 through the pin 701 on the third arm 130.

While the invention has been particularly shown and described with reference to preferred embodiments thereof, it will be understood by those skilled in the art that the foregoing and other changes in form and details can be made therein without departing from the spirit and scope of the invention.

I claim:

1. In a camera including displacement means displaceable by the driving force of a driving source from a position corresponding to the maximum aperture of a taking lens to a position corresponding to the minimum aperture of said lens so as to stop down the aperture and particular devices operable after the displacement of said displacement means, a device for controlling said aperture comprising:
   means for regulating the speed of displacement of said displacement means, said speed regulating means including
   means for accumulating mechanical energy to be used for operating said particular device or devices;
   means for connecting said energy accumulating means to said driving source during the displacement of said displacement means thereby accumulating the mechanical energy by a portion of the driving force from said driving source; and
   locking means for inhibiting said displacement means against further displacement when said aperture has been stopped down to a determined aperture value.

2. A camera as set forth in claim 1, wherein said particular devices include a shutter device to be shifted from a first position to a second position for exposure, and said energy accumulating means includes means for biasing said shutter device toward the second position.

3. A camera as set forth in claim 1, wherein said particular devices include a reflection mirror displaceable between a first position across the optical path of said taking lens and a second position retracted from said optical path, and said energy accumulating means includes means for biasing said reflection mirror toward the second position.

4. A camera as set forth in claim 1, wherein said particular devices include a light measuring device having photo sensor means for receiving the light transmitted through said taking lens and displaceable between a first position for bringing said photo sensor means into the optical path of said lens and a second position for retracting said photo sensor means from said optical path, and said energy accumulating means includes means for biasing said measuring device toward the second position.

5. A camera as set forth in claim 1, wherein said driving source includes an electric motor, and said displacement means includes cam means to be rotated by said electric motor and a displacement member responsive to said cam means.

6. In a camera provided with an electric motor and a transmission mechanism for transmitting the driving force of said electric motor to drive a mechanism to be reciprocally moved in connection with the operation for exposure, said transmission mechanism comprising:

(a) first link means one end of which is fixed to a rotation shaft to be driven into rotation by said motor;

(b) second link means having an end rotatably connected with another end of said first link means;

(c) third link means having an end rotatably connected with another end of said second link means and another end connected with said reciprocating mechanism;

(d) guide means for releasably holding the rotation center between said second and third link means coaxial with the rotation axis of said first link means; and (e) means for uniting said second and third link means together when the angle formed by said second and third link means reaches a determined value.

7. A camera as set forth in claim 6, wherein said first and second link means have the same length.

8. A camera as set forth in claim 6, wherein said determined angle is 180° or more.

9. A camera as set forth in claim 8, wherein said guide means is allowed to release the hold when said angle reaches a determined value.

10. A camera as set forth in claim 6, wherein said guide means includes rod means provided at said one end of said first link means or at said another end of said second link means and disposed projecting toward the direction of said rotation axis; and bearing means provided at said another end of said second link means or at said one end of said first link means and disposed engageable with said rod means, said bearing means having an opening which said rod means can pass through in the direction intersecting said rotation axis.

* * * * *